US010805558B2

(12) United States Patent
Dragon

(10) Patent No.: US 10,805,558 B2
(45) Date of Patent: Oct. 13, 2020

(54) SYSTEM FOR PRODUCING AUGMENTED IMAGES

(71) Applicant: uniqFEED AG, Opfikon-Glattbrugg (CH)

(72) Inventor: Ralf Dragon, Hannover (DE)

(73) Assignee: UNIQFEED AG, Zurich (CH)

( * ) Notice: Subject to any disclaimer, the term of this patent is extended or adjusted under 35 U.S.C. 154(b) by 0 days.

(21) Appl. No.: 16/341,858

(22) PCT Filed: Oct. 9, 2017

(86) PCT No.: PCT/EP2017/075625
§ 371 (c)(1),
(2) Date: Apr. 12, 2019

(87) PCT Pub. No.: WO2018/069220
PCT Pub. Date: Apr. 19, 2018

(65) Prior Publication Data
US 2019/0327427 A1  Oct. 24, 2019

(30) Foreign Application Priority Data

Oct. 14, 2016 (DE) .................. 10 2016 119 640

(51) Int. Cl.
*H04N 7/10* (2006.01)
*H04N 7/025* (2006.01)
(Continued)

(52) U.S. Cl.
CPC ........... *H04N 5/2723* (2013.01); *G06T 13/80* (2013.01); *G06T 19/006* (2013.01)

(58) Field of Classification Search
CPC .......... G02B 2027/0138; G06T 19/006; G06F 3/011; H04N 5/272; H04N 5/232939
See application file for complete search history.

(56) References Cited

U.S. PATENT DOCUMENTS

| 5,731,846 A | 3/1998 | Kreitman et al. |
| 6,292,227 B1 | 9/2001 | Wilf et al. |

(Continued)

FOREIGN PATENT DOCUMENTS

| DE | 102004011629 A1 | 10/2004 |
| EP | 0683961 A1 | 11/1995 |

(Continued)

OTHER PUBLICATIONS

"Location Android Developer", https://web.archive.org/web/20140701065849/http://developer.android.com/reference/android/location/Location.html, Aug. 5, 2015, pp. 1-8.

(Continued)

*Primary Examiner* — Jason Salce
(74) *Attorney, Agent, or Firm* — Murphy, Bilak & Homiller, PLLC

(57) ABSTRACT

The invention relates to a system (10) for producing augmented images, comprising at least one image-recording device (12), at least one analysis module (14) connected to the image-recording device (12), and at least one display device (18) connected to the analysis module (14), wherein the image-recording device (12) is designed to transfer images, in particular image data, to the analysis module (14), and wherein the analysis module (14) is designed to transfer control data (S2) to the display device (18), wherein the control data (S2) comprise the image data and instruction data for the display of at least one augmentation in an image, wherein the display device (18) is designed to reproduce a recorded image and an associated augmentation on the basis of the control data (S2), characterized in that the system (10) also comprises an expansion module (16), which is arranged in the transfer path between the analysis module (14) and the display device (18). According to the invention, the analysis module (14) is also designed to produce at least one piece of (Continued)

reliability information (R2) for each image, and the expansion module (16) is designed to receive the control data (S2) and the reliability information (R2) from the analysis module (14) and to produce control data (S2b) modified on the basis of the control data (S2) and the reliability information (R2) and to transfer the modified control data to the display device (18).

13 Claims, 5 Drawing Sheets

(51) Int. Cl.
*H04N 5/272* (2006.01)
*G06T 13/80* (2011.01)
*G06T 19/00* (2011.01)

(56) References Cited

U.S. PATENT DOCUMENTS

| | | | |
|---|---|---|---|
| 6,384,871 | B1 | 5/2002 | Wilf et al. |
| 7,158,666 | B2 | 1/2007 | Deshpande et al. |
| 9,892,538 | B1 | 2/2018 | Balasubramanian et al. |
| 2003/0001954 | A1 | 1/2003 | Rantalainen et al. |
| 2004/0085342 | A1 | 5/2004 | Williams et al. |
| 2006/0026628 | A1 | 2/2006 | Wan et al. |
| 2010/0277468 | A1* | 11/2010 | Lefevre ............... G06T 19/006 345/419 |
| 2012/0033032 | A1* | 2/2012 | Kankainen ......... H04N 5/23293 348/36 |
| 2013/0050294 | A1 | 2/2013 | Hubo |
| 2013/0249900 | A1* | 9/2013 | Lee ..................... G06F 3/0304 345/419 |
| 2015/0007218 | A1 | 1/2015 | Neumann et al. |
| 2015/0163416 | A1 | 6/2015 | Nevatie |
| 2015/0206349 | A1* | 7/2015 | Rosenthal ......... H04N 21/4788 345/633 |
| 2016/0028968 | A1 | 1/2016 | Affaticati |
| 2016/0217604 | A1 | 7/2016 | De Roos et al. |
| 2016/0226253 | A1* | 8/2016 | Abido .................. H02J 3/383 |
| 2016/0227275 | A1 | 8/2016 | Vuori |
| 2016/0373814 | A1* | 12/2016 | Kellner ........... H04N 21/45452 |
| 2017/0237910 | A1 | 8/2017 | Salin et al. |

FOREIGN PATENT DOCUMENTS

| | | | |
|---|---|---|---|
| EP | 1071278 | A2 | 1/2001 |
| EP | 2463821 | A1 | 6/2012 |
| EP | 2498489 | A1 | 9/2012 |
| EP | 2822288 | A1 | 1/2015 |
| FR | 2959339 | A1 | 10/2011 |
| GB | 2408164 | A | 5/2005 |
| KR | 20130022491 | A | 3/2013 |
| KR | 20130115332 | A | 10/2013 |
| WO | 9631047 | A2 | 10/1996 |
| WO | 9712480 | A2 | 4/1997 |
| WO | 2014031899 | A1 | 2/2014 |

OTHER PUBLICATIONS

Abawi, Daniel F, et al., "Accuracy in Optical Tracking with Fiducial Markers: An Accuracy Function for ARToolKit", Proceedings of the Third IEEE and ACM International Symposium on Mixed and Augmented Reality (ISMAR 2004), 2004, pp. 1-2.
Hallaway, Drexel, et al., "Bridging the Gaps: Hybrid Tracking for Adaptive Mobile Augmented Reality", Applied Artificial Intelligence; vol. 18, No. 6, Jul. 1, 2004, pp. 477-500.
Jain, Ramesh, et al., "Metadata in Video Databases", ACM SIGMOD Record., vol. 23, No. 4, Dec. 1994, pp. 27-33.
Lindner, Manfred, "Content Management—technische Aufbereitung, Transport und Präsentation von Daten", Elektrotechnik und Informationstechnik. Heft 7/8, Jul./Aug. 2003, pp. 245-250.
Lu, Boun Vinh, et al., "Foreground and Shadow Occlusion Handling for Outdoor Augmented Reality", 9th IEEE International Symposium, 2010, pp. 109-118.
Paulevé, Loïc, et al., "Locality sensitive hashing: A comparison of hash function types and querying mechanisms", Pattern Recognition Letters, Bd. 31, H. 11, 2010, pp. 1348-1358.
Segal, Mark, et al., "The OpenGL Graphics System: A Specification (Version 1.2.1)", Silicon Graphics, Inc., Oct. 14, 1998, pp. 1-278.
Shepard, Daniel P., et al., "Precise Augmented Reality Enabled by Carrier-Phase Differentiated GPS", 25th International Technical Meeting of the Satellite Division of the Institute of Navigation, Nashville, TN, Sep. 17-12, 2012, pp. 3169-3184.
Sun, Jiande, et al., "Unequally Weighted Video Hashing for Copy Detection", Advances in Multimedia Modeling; 19th International Conference, MMM; Huangshan, China, Jan. 7-9, 2013, pp. 546-557.
Weng, Li, et al., "From Image Hashing to Video Hashing", Advances in Multimedia Modeling; 16th International Conference, MMM, Chongqing, China, 2010, pp. 662-668.
Xu, Changsheng, et al., "Implanting Virtual Advertisement into Broadcast Soccer Video", Pacific-Rim Conference on Multimedia, 2004, LNCS 3332; Springer-Verlag Berlin Heidelberg, 2004, pp. 264-271.

* cited by examiner

SYSTEM FOR PRODUCING AUGMENTED IMAGES

The present invention relates to a system for generating augmented images, comprising at least one image-recording device, at least one analysis module connected to the image-recording device, and at least one display device connected to the analysis module, wherein the image-recording device is configured to transmit images, in particular, image data, to the analysis module, and wherein the analysis module is configured to transmit control data to the display device, wherein the control data comprise the image data and instruction data for the display of at least one augmentation in an image, wherein the display device is configured to reproduce a recorded image and an associated augmentation on the basis of the control data.

Such systems are especially used in so-called augmented reality systems. These usually comprise a camera (image-recording device), a processing unit (analysis module) and a display (display device). The processing unit identifies information about the geometric and radiometric relationship between camera and environment, so that it can subsequently insert realistically looking objects into the scene. The geometric relationship, i.e. the position of the camera in space, can, for example, be determined by external infrared trackers, by visible markers in the scene, or by acceleration or step sensors. The radiometric relationship, i.e. the illumination difference between the recorded environment and an artificially generated image can, for example, be determined by intensity comparisons between a template and the current recording.

If, however, in such a known system, there are difficulties with a component, which detects or calculates the geometric or radiometric relationship between camera and environment, or if a realistic image cannot be generated for other reasons, an image is usually generated which does not appear realistic, or an image where no augmented reality is faded in. In both cases, an inadequate result will emerge, i.e. in the images displayed by the display device.

Object of the invention is to provide a system for the augmentation of images, which makes it possible to avoid the disadvantages above.

For the solution of this problem it is suggested that the system further comprises an expansion module, which is arranged in the transfer path between the analysis module and the display device, that the analysis module is further configured to generate at least one piece of reliability information for each image, and that the expansion module is configured to receive the control data and the reliability information from the analysis module and generate control data modified on the basis of the control data and of the reliability information and transmit same to the display device.

In this process, the expansion module allows, by means of the reliability information, to take into account measuring tolerances of sensors, for example, or determine in which state a sensor system is (malfunction/in operation or the like). Accordingly, the control data, which are usually passed on directly to the display device, can be adjusted if necessary by means of the expansion module and changed or modified in such a manner that modified control data are transmitted to the display device and can be displayed there, which represent an illustration with a good result, especially with regard to the augmentations in the images recorded by the image-recording device and reproduced by means of the display device.

The term "augmentation" used herein is meant to designate a kind of enhancement or change of the reproduction of reality. One, for example, considers a superimposition of an advertising message written in reality in the English language on a banner of a sports field with a same or another advertising in a different language. The German term "Anreicherung" used herein is also known as "Augmentierung" in the technical jargon, which is oriented on the English term "augment" which means improve, enhance, enrich.

The expansion module can have a state module and an animation module, wherein the state module is configured to receive the reliability information, select a piece of state information from a plurality of, in particular four, pieces of state information, and pass the state information selected on to the animation module. In this process, the animation module can be configured to receive the control data and generate the modified control data based on the state information.

The animation module can be further configured, depending on the state information, to transmit the image data and instruction data for the augmentation as modified control data, which corresponds to a switch-on state for augmentations, or transmit only the image data as modified control data, which corresponds to a switch-off state for augmentations, or transmit a transition animation as part of the modified control data, wherein the transition animation is selected when switching between the switch-on state and the switch-off state.

Preferably, the transition animation is designed in such a manner that real data detected by the image-recording device and data of an augmentation to be displayed are processed in an integrated manner and displayed. Accordingly, a degree of realism can be achieved by integrating the reality into a transition animation, where it is not recognizable to a viewer of the display device if the system currently displays an augmentation or represents real images without augmentation.

The animation module can include a realization module, which is configured to create a transition animation, which has a specific number of images, and store it in an animation buffer. Furthermore, the animation module can include an animation memory, which is configured to store predetermined transition animations in the form of computer-readable instructions. Thus, prefabricated or readily programmed transition animations can be provided in the animation memory. These stored transition animations can be read from the animation memory by the realization module depending on the control data, in particular, the reliability information and the state information, and combined with the control data, so that the modified control data contain the selected transition animation to enable a switch between switch-on state and switch-off state.

The animation module can be further configured to remove, in the switch-off state, the instruction data for an augmentation from the control data provided by the analysis module, and only to transmit the image data as modified control data to the display device.

Furthermore, the animation module can be configured to modify the control signals of the analysis module according to the state information in such a manner that a transition animation is inserted smoothly when switching between the switch-on state and the switch-off state.

The transition animation can be executed as a virtual rolling banner or as a virtual window or the like.

It is pointed out that the above-described switch between switch-on state and switch-off state comprises a shift in both directions, i.e. from the switch-on state to the switch-off state and from the switch-off state to the switch-on state.

The invention further relates to the use of an above-described system in a television broadcast system and/or in a virtual advertising display system and/or in an augmented reality system.

To use a system described herein within the scope of a television broadcast system, reference is made to the parallel application entitled "Television broadcast system for generating augmented images" of the same applicant filed on Oct. 14, 2016 and assigned German Patent Application No. DE 102016119637A. Reference is particularly made to the multiplication module described in DE 102016119637A with reference to FIGS. 4 to 6 and to the control module, where a system according to the present application can be incorporated.

In the following text, the invention is exemplarily and non-restrictingly described with reference to the accompanying figures.

Figure 1:
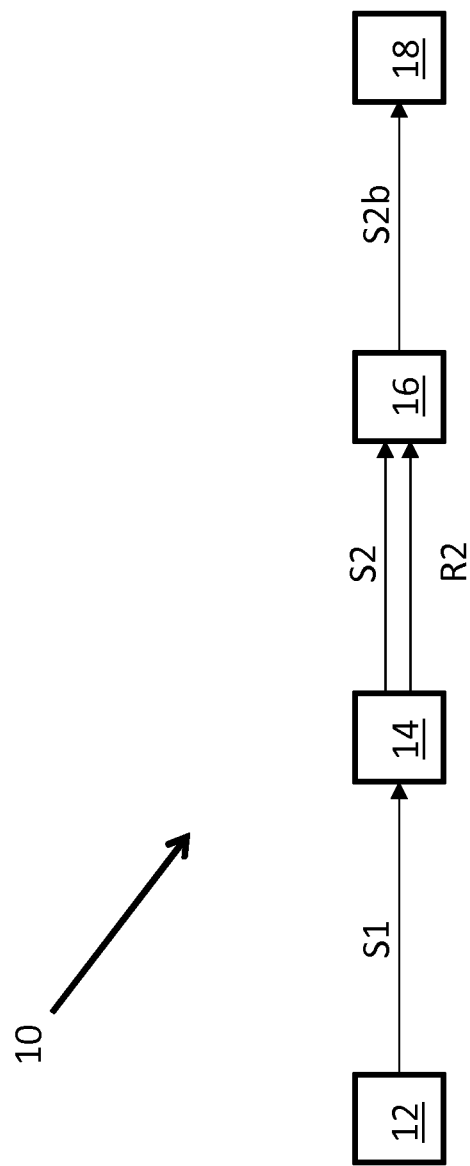
FIG. 1 shows a simplified and schematic representation of a system for the generation of augmented images.

FIG. 1 shows a diagram of a system 10 for the generation of augmented images in a simplified and schematic manner. The system comprises an image-recording device or camera 12, an analysis module 14, an expansion module 16, and a display device or a display 18. The image-recording device 12 transmits camera images (and, where required, additional sensor data) as camera data S1 to the analysis module 14. The analysis module 14 processes these camera data S1 and generates therefrom control data S2 or control commands S2. Such control data or control commands S2 can, for example, be OpenGL commands and OpenGL textures. The control data S2 are sent to the expansion module 16. The expansion module 16 is configured to change the control data S2. The sensor data or camera data S1 are expanded by the analysis module 14 by reliability information R2, for example, measuring tolerances of sensors.

The expansion module 16 generates modified control data S2$b$ from the control data S2 and the reliability information R2 to control the display device 18.

Figure 2:
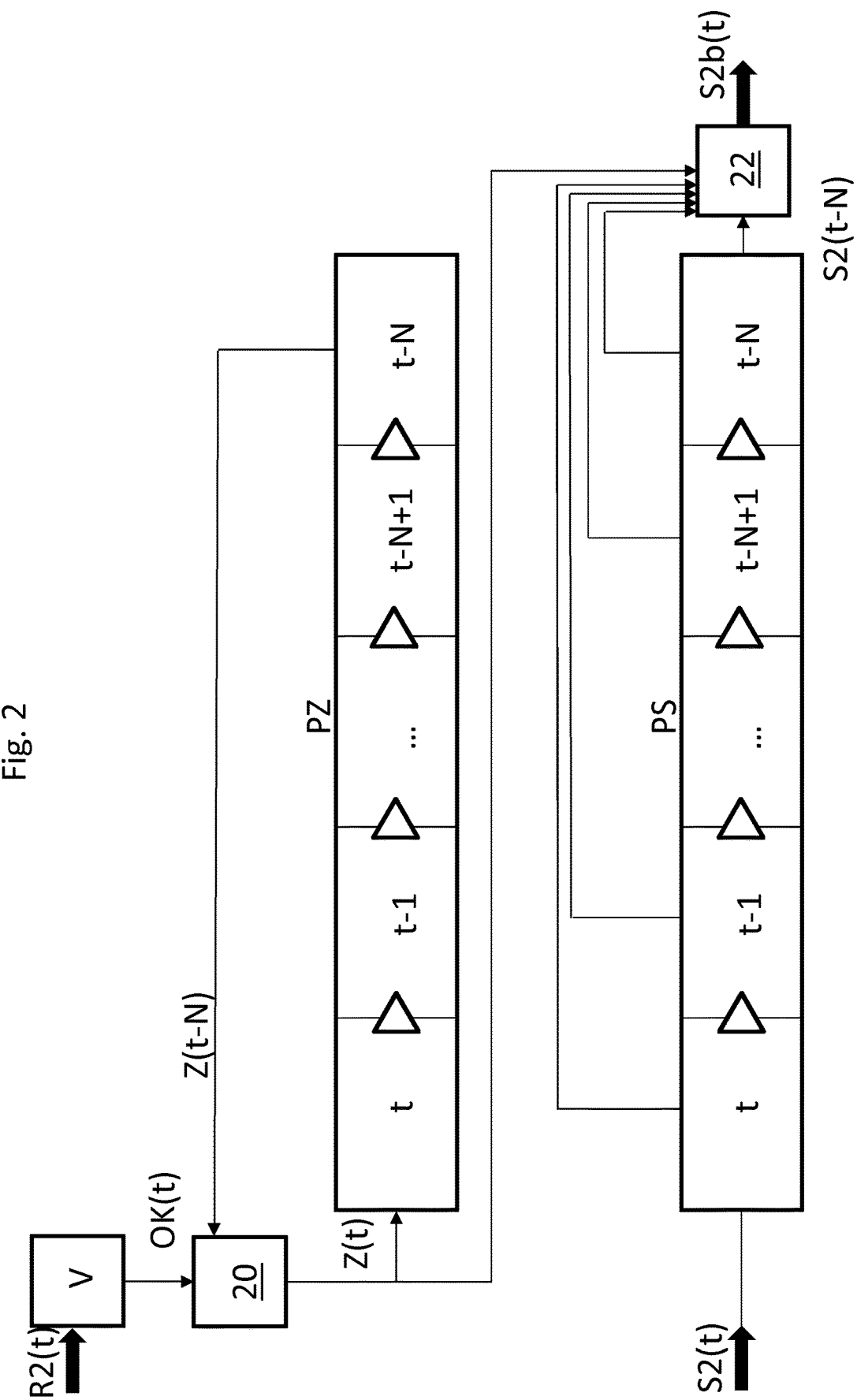
FIG. 2 shows an expansion module of the system in a schematic and simplified manner.

With reference to FIG. 2, the expansion module 16 is described in the following text. The expansion module 16 comprises a component V, which is configured to convert reliability information R2 or a reliability signal R2 into a binary signal OK(t). In this process, the conversion can, for example, be based on a threshold value comparison in order to decide, which binary value is assigned to the signal OK. The signal OK(t) indicates whether the control data S2($t$) are suited to be displayed. The signal OK is transferred from the component V to a state module 20, which can also be designated as a state manager.

The state module 20 selects one of a plurality of, in the present example four, possible states Z(t) and passes this state Z(t) on to an animation module 22, which can also be designated as an animation manager. In this process, the selection of a state Z(t) is based on previous states, such as a state Z(t−N). Previous states, such as Z(t−N), Z(t−N+1) etc., are stored in a state buffer PZ and can, where required, also be retrieved by module 20.

The animation module 22 receives the control data S2, which can be delayed or have been delayed by up to N cycles by a buffer PS. Furthermore, the animation module 22 receives the state Z(t) as an input variable or input, i.e. the state that is to be achieved in N cycles.

The state module 20 determines the state of the animation module 22. In the present example, four states Z(t) are differentiated, which impact the output of modified control data S2$b$(t) of the animation module 22.

In this process, the states can be described by two variables EN and TR, with EN being a representation whether augmentations are switched on or switched off, and with TR being a representation whether a transition animation is to be played when switching between a switch-on state and a switch-off state.

The states are:

Z=1, with EN=1 and TR=0, and the animation module 22 is to output unmodified control data S2($t$–N), i.e. the augmentations are switched on (switch-on state);

Z=2, with EN=0 and TR=0, and the animation module 22 is to output original images from the control data S2($t$–N) as modified control data S2$b$, without fading in augmentations, i.e. the augmentations are switched off (switch-off state);

Z=3, with EN=1 and TR=1, and the animation module 22 is to play a transition animation starting from a switch-on state (Z=1) moving to a switch-off state (Z=2); and Z=4, with EN=0 and TR=1, and the animation module 22 is to play a transition animation starting from a switch-off state (Z=2) moving to a switch-on state (Z=1).

Figure 3:
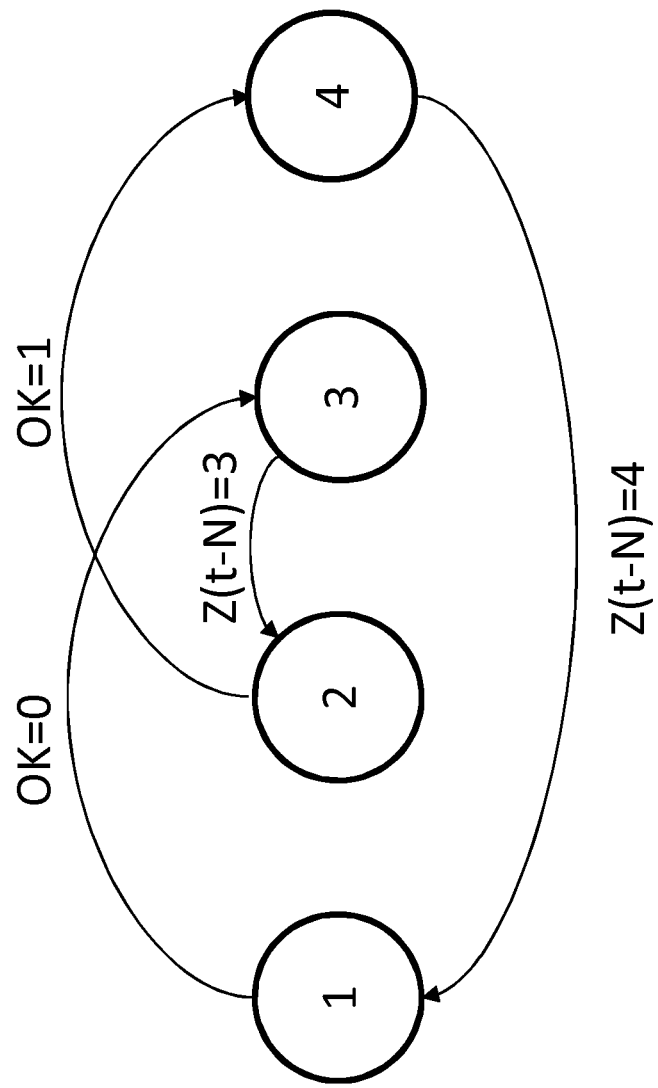
FIG. 3 shows possible states and associated state transitions in a schematic and simplified manner.

The states Z(t)=1 to 4 and their transitions are shown in FIG. 3 as a diagram in an exemplary manner. In this process, switching off the display of augmentations is a transition lasting N cycles from Z=1 and OK=0 (data S2($t$) are not suited for display) via Z=3 to Z=2. Switching on the display of augmentations is a transition lasting N cycles from Z=2 and OK=1 (data S2($t$) are suited for display) via Z=4 to Z=1.

Figure 4:
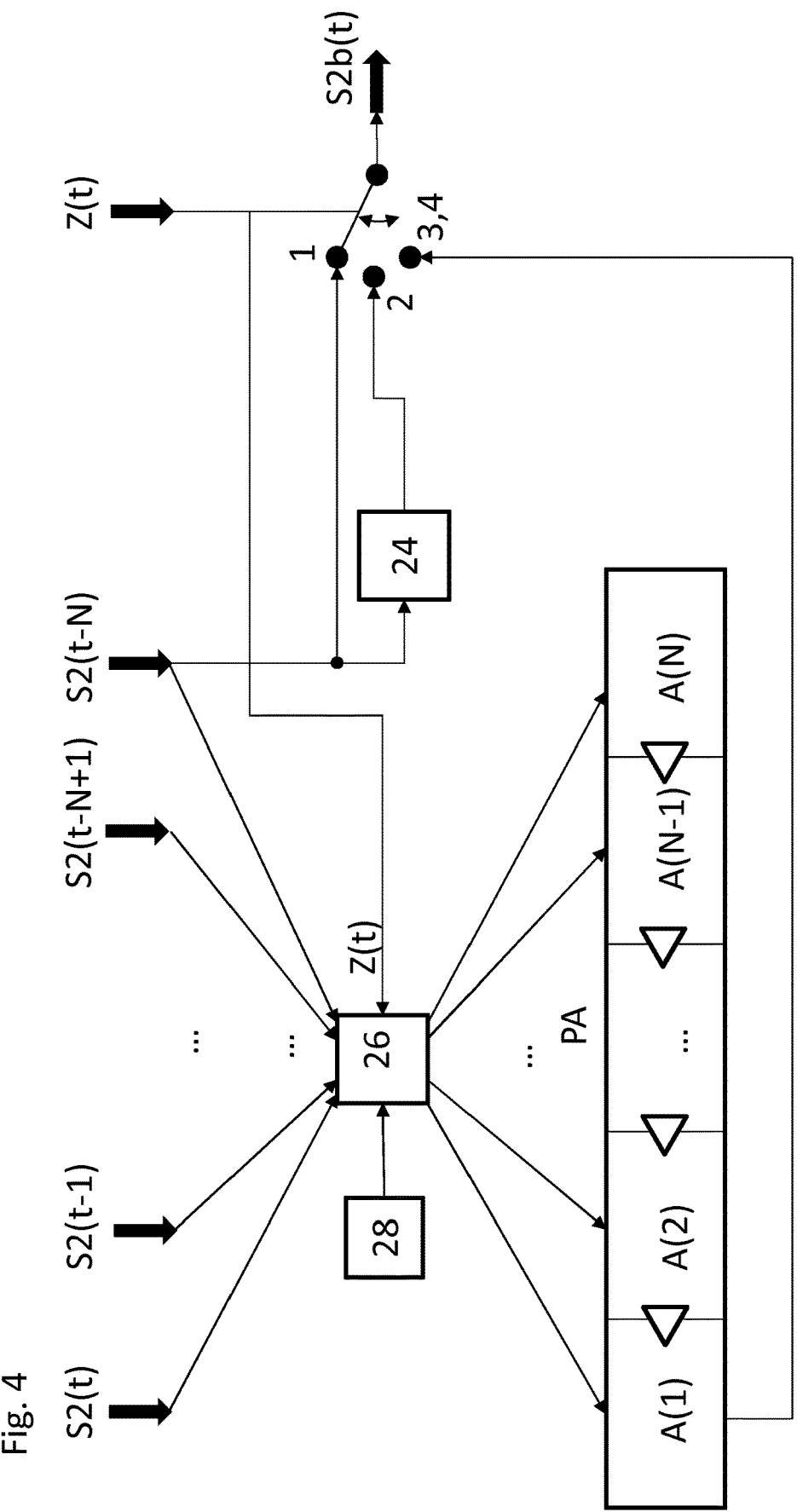
FIG. 4 shows the functioning of an animation module of the expansion module in a schematic and simplified manner.

In FIG. 4 the functioning of the animation module 22 is schematically shown in a diagram. The object of the animation module 22 is to modify the control signals S2 depending on or according to the state Z(t), so that, when states shift, smooth transition animations can be inserted, and that the display device 18 displays the original images recorded by the recording device 12 for the state Z=2 (switch-off state).

In this process, the transition animations are not only configured or executed in such a manner that an augmentation is slowly more and more faded in or faded out. Rather, control commands can be modified by the expansion module 16, in particular, by the animation module 22. Thus, transition animations can be deliberately created, so that it is not recognizable to a viewer of the display device 18, whether currently the reality (original images) or augmented images (with augmentations) are displayed.

The state Z(t) selects whether S2($t$-N) is to be outputted unchanged, i.e. whether the augmentation is to be removed from the control data S2 by a module 24, or whether a transition animation A is to be played.

In the case of a change in state or a shift from Z=1 to Z=3 (switch off) and Z=2 to Z=4 (switch on), an N images long animation A is generated by a realization module 26 and stored in the animation buffer PA. Subsequently, the transition animation A is transmitted instead of S2 as modified control data S2$b$ to the display device 18.

A(1) designates the first image of the transition animation A generated by the display device 18, A(N) the last one. For a smooth switch-off transition animation, the rendered image A(N) must correspond to the image S2(*t*) (without augmentation). Analogously, A(1) must correspond to the image S2(*t*–*N*) (without augmentation) for a smooth switch-on transition animation.

The animation module 22 further comprises an animation database (animation memory) 28. In the animation database 28, the transition animations A are in the form of program code instructions, which are used to convert the control data S2 to transition animations A. The instructions can, for example, use textures, which are only replaced by parts of S2(*t*) to S2(*t*–*N*) at runtime. This takes place in a manner similar as for the definition of animations in known non-linear video editing programs for post-production (e.g. Adobe After Effects, Adobe Premiere, Davinci Resolve, Nuke). However, these known programs cannot be used live, and the effects generated by these programs are not linked to control information, but applied to entire video clips.

At the time at which the transition animation is to be created, the animation module 22 has, with the control data S2(*t*) to S2(*t*–*N*), all information how and where an augmentation would be represented in the state Z=1. The effect database 28 contained in the animation module 22 defines how control data S2 for the effect realization in the realization module 26 must be modified to create a transition animation A and store it in the animation buffer PA.

For example, OpenGL coordinate transformations of control data S2 can be performed by the realization module 26 to achieve a 2D or 3D shift or a rotation, or OpenGL textures can be created based on the images contained in S2 and integrated into the transition animation A.

Figure 5:
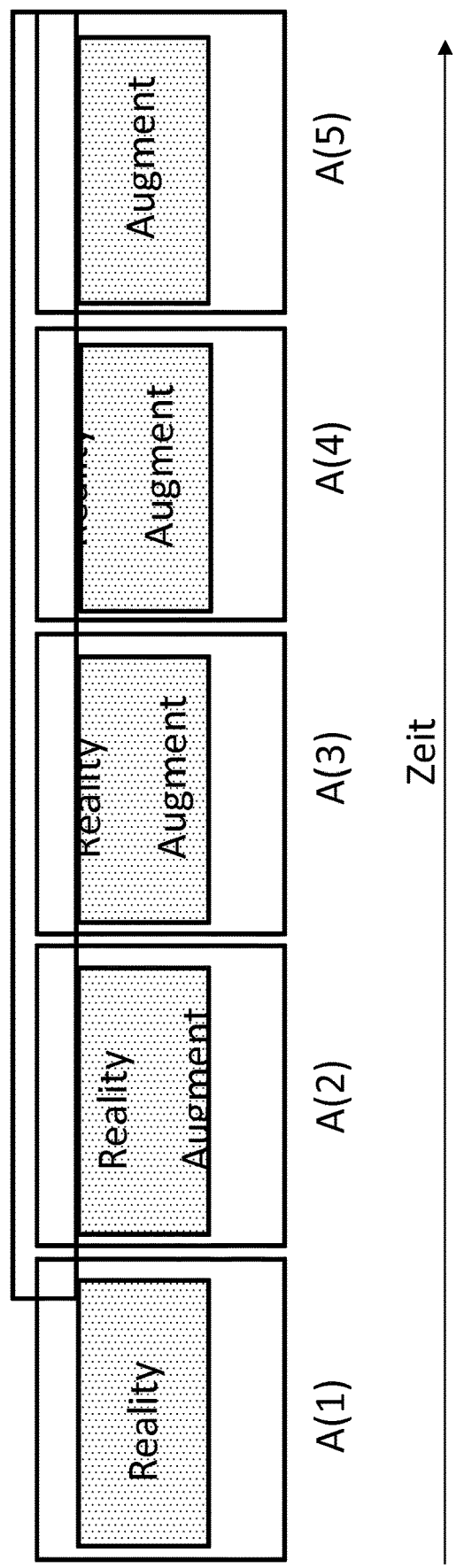
FIG. 5 shows the procedure of a transition animation based on a virtual rolling banner in a schematic and simplified manner.

FIG. 5 shows a transition animation of a so-called virtual rolling banner in a purely exemplary and simplified manner. The transition from state Z=2 (switch-off state, no augmentation) in the first image (left) is made via the state Z=4 (transition animation) in the images 2 to 4 (from left) to the state Z=1 (switch-on state, augmentation is displayed or superimposed). In this process, the dotted area or the surface shown in dotted lines shows the area that would be augmented in the state Z=1, which, however, will only be completely augmented in the fifth image (after playing the transition animation in the images 2-4).

This transition animation is effected here, in a purely exemplary manner, by N=5 cycles. In concrete applications, transition animations will rather require more cycles for a fluent or smooth transition. The realization of the transition animation can be realized as follows:

The texture "reality" is extracted from the original image in S2(*t*–N) at that location where the augmentation would be faded in. A new texture T is created by connecting "reality" and "augment" vertically to one another. The control commands are accordingly adjusted in the transition animation A, so that, instead of a direct (transitionless) display of "augment", the new texture T is displayed, which is a combination of "reality" and "augment".

The vertical roll movement can, for example, be created by a region-of-interest (ROI) operator which is applied to the texture T. In A(1) it selects the upper half (i.e. reality), then in A(2) to A(4) deeper and deeper ROIs until it precisely selects the texture "augment" in A(5), which is further displayed after the animation, since the state Z=1 is achieved.

The control commands for realization are integrated into the transition animation A, output as modified control data S2*b*(t), and ultimately output by the display device 18, as already explained above.

Hence, the system presented herein allows, through integration of the reality into a switch-on or switch-off transition animation of an augmentation (virtual object), a degree of realism where it cannot be recognized whether the system related to the display or superimposition of augmentations enables (switch-on state) or disables (switch-off state).

The invention claimed is:

1. A system for generating augmented images, comprising:
    at least one image-recording device;
    at least one analysis module connected to the at least one image-recording device
    at least one display device connected to the at least one analysis module; and
    an expansion module arranged in a transfer path between the at least one analysis module and the at least one display device,
    wherein the at least one image-recording device is configured to transmit images, including image data, to the at least one analysis module,
    wherein the at least one analysis module is configured to transmit control data to the at least one display device, the control data comprising the image data and instruction data for the at least one display of at least one augmentation in an image,
    wherein the at least one display device is configured to reproduce a recorded image and an associated augmentation based on the control data,
    wherein the at least one analysis module is configured to generate at least one piece of reliability information for each image,
    wherein the expansion module is configured to receive the control data and the reliability information from the at least one analysis module, generate control data modified based on the control data and the reliability information, and transmit the modified control data to at least one the display device.

2. The system of claim 1, wherein the expansion module includes a state module and an animation module, and wherein the state module is configured to receive the reliability information, select a piece of state information from a plurality of pieces of state information, and transfer the selected state information to the animation module.

3. The system of claim 2, wherein the animation module is configured to receive the control data and generate the modified control data based on the state information.

4. The system of claim 2, wherein the animation module is configured, depending on the state information, to transmit the image data and instruction data for the augmentation as modified control data, which corresponds to a switch-on state for augmentations, or transmit the image data only as modified control data, which corresponds to a switch-off state for augmentations, or transmit a transition animation as part of the modified control data, wherein the transition animation is selected when switching between the switch-on state and the switch-off state.

5. The system of claim 4, wherein the transition animation is configured in such a manner that real data detected by the at least one image-recording device and data of an augmentation to be displayed are processed in an integrated manner and displayed.

6. The system of claim 4, wherein the animation module includes a realization module configured to create a transition animation which has a specific number of images, and store the transition animation having the specific number of images in an animation buffer.

7. The system of claim 4, wherein the animation module includes an animation memory configured to store predetermined transition animations in the form of computer-readable instructions.

8. The system of claim 4, wherein the animation module is configured to remove the instruction data for an augmentation from the control data provided by the at least one analysis module in the switch-off state and transmit only the image data as modified control data to the at least one display device.

9. The system of claim 4, wherein the animation module is configured to modify the control signals of the at least one analysis module corresponding to the state information in such a manner that a transition animation is inserted smoothly when switching between the switch-on state and the switch-off state.

10. The system of claim 4, wherein the transition animation is a virtual rolling banner or a virtual window.

11. A television broadcast system comprising the system of claim 1.

12. A virtual advertising display system comprising the system of claim 1.

13. An augmented reality system comprising the system of claim 1.

* * * * *